(12) United States Patent
Salvatori et al.

(10) Patent No.: US 12,492,644 B2
(45) Date of Patent: Dec. 9, 2025

(54) HIGH-PRESSURE GAS TURBINE FOR TURBOMACHINE AND TURBOMACHINE

(71) Applicant: SAFRAN AIRCRAFT ENGINES, Paris (FR)

(72) Inventors: Francesco Salvatori, Moissy-Cramayel (FR); Damien Bonneau, Moissy-Cramayel (FR); Nicolas Contini, Moissy-Cramayel (FR); Clément Jarrossay, Moissy-Cramayel (FR); Pascal Cédric Tabarin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/694,555

(22) PCT Filed: Sep. 2, 2022

(86) PCT No.: PCT/FR2022/051662
§ 371 (c)(1),
(2) Date: Mar. 22, 2024

(87) PCT Pub. No.: WO2023/047033
PCT Pub. Date: Mar. 30, 2023

(65) Prior Publication Data
US 2025/0003347 A1    Jan. 2, 2025

(30) Foreign Application Priority Data
Sep. 27, 2021   (FR) ........................... 2110131

(51) Int. Cl.
*F01D 11/00*   (2006.01)
*F01D 9/04*    (2006.01)
*F01D 11/02*   (2006.01)

(52) U.S. Cl.
CPC ............ *F01D 11/001* (2013.01); *F01D 9/041* (2013.01); *F01D 11/02* (2013.01)

(58) Field of Classification Search
CPC ........ F01D 11/001; F01D 9/041; F01D 11/02; F01D 11/04; F05D 2240/126;
(Continued)

(56) References Cited

U.S. PATENT DOCUMENTS 9,605,552 B2 * 3/2017 Wondrasek ............ F01D 5/3015
9,938,847 B2 * 4/2018 Li .......................... F01D 11/08
(Continued)

FOREIGN PATENT DOCUMENTS

| FR | 2930593 A1 | 10/2009 |
| FR | 2940351 A1 | 6/2010 |
| FR | 3001492 A1 | 8/2014 |

OTHER PUBLICATIONS

International Search Report and Written Opinion in corresponding International Patent Application No. PCT/FR2022/051662, mailed Nov. 7, 2022, 13 pages.

*Primary Examiner* — Brian Christopher Delrue
(74) *Attorney, Agent, or Firm* — Cozen O'Connor

(57) ABSTRACT

A high-pressure gas turbine for a turbomachine includes a nozzle guide vane assembly, an annular array of movable blades mounted downstream of the nozzle guide vane assembly, a bleed cavity, an upstream sealing element mounted on the nozzle guide vane assembly and a downstream sealing element mounted on the annular array of movable blades, a double baffle being formed by said upstream and downstream sealing elements, an external upstream cavity being formed in the upstream sealing element.

9 Claims, 4 Drawing Sheets

(58) Field of Classification Search
CPC ......... F05D 2240/127; F05D 2250/185; F05D 2220/3212
See application file for complete search history.

(56) References Cited

U.S. PATENT DOCUMENTS

| | | | |
|---|---|---|---|
| 2015/0354391 A1* | 12/2015 | Li | F01D 11/08 |
| | | | 415/173.1 |
| 2020/0308972 A1* | 10/2020 | Tyler | F01D 11/005 |
| 2024/0392692 A1* | 11/2024 | Salvatori | F01D 11/02 |

* cited by examiner

HIGH-PRESSURE GAS TURBINE FOR TURBOMACHINE AND TURBOMACHINE

CROSS-REFERENCE TO RELATED APPLICATIONS

This application is a US National phase Application of PCT/FR2022/051662 filed Sep. 2, 2022, which claims priority to French Patent Application No. 2110131 filed Sep. 27, 2021, both of which are hereby incorporated in their entirety.

TECHNICAL FIELD

This description relates to a high-pressure gas turbine for a turbomachine. It also relates to a turbomachine comprising such a gas turbine.

BACKGROUND

Conventionally, as shown in FIG. 1, a turbomachine 10 of the dual-flow turbojet type comprises, from upstream to downstream in the direction that the gases circulate inside turbomachine 10, a fan 14, a low-pressure compressor 16, a high-pressure compressor 18, a combustion chamber 20, a high-pressure turbine 22, a low-pressure turbine 24, and an exhaust nozzle 26. Low-pressure compressor 16, high-pressure compressor 18, combustion chamber 20, high-pressure turbine 22, low-pressure turbine 24, and exhaust nozzle 26 are arranged radially internally to a housing 12 which, radially externally to these elements, defines an annular path 11 in turbomachine 10 in which the gases flow from upstream to downstream.

High-pressure compressor 14 and low-pressure compressor 18 are respectively connected to high-pressure turbine 22 and low-pressure turbine 24 by a respective shaft 15, 17 extending along the longitudinal axis X of rotation of the shafts of turbomachine 10. In the following, orientational qualifiers such as "longitudinal", "radial", and "circumferential" are defined in reference to the longitudinal axis. Furthermore, the terms upstream and downstream are defined in relation to the direction the gas circulates within the turbomachine.

High-pressure turbine 22 comprises a plurality of stages, one of them partially represented in FIG. 2, each comprising a nozzle guide vane assembly 30 and a movable wheel 40 mounted downstream of nozzle guide vane assembly 30.

Nozzle guide vane assembly 30 comprises an internal annular platform 34 and an annular array of fixed vanes 32. Each fixed vane 32 extends radially in the annular path 11 and is connected, radially inwards, to internal annular platform 34. Nozzle guide vane assembly 30 generally comprises an annular radial flange 36 for attachment to housing 5.

Movable wheel 40 comprises an annular array of movable blades 42 carried by a disc 41 comprising a plurality of sockets on its outside periphery, each receiving a root 46 of a blade 42. Each movable blade 42 further comprises a sector of an internal annular platform 44 of movable wheel 40, from which a vane 42' extends radially outwards through annular path 11. Internal annular platform 44 thus comprises a plurality of sectors arranged circumferentially end-to-end around the longitudinal axis X.

Internal annular platform 34 of nozzle guide vane assembly 30 and internal annular platform 44 of movable wheel 40 each delimit, radially inwards, annular path 11.

During operation, the gases flowing in annular path 11 find their way into a space formed longitudinally between internal annular platform 34 of nozzle guide vane assembly 30 and internal annular platform 44 of movable wheel 40, which reduces the performance of turbomachine 10. To limit this phenomenon, it is known to arrange, radially internally to internal annular platform 34 of nozzle guide vane assembly 30, an upstream annular deflector 47 of internal annular platform 44 and a downstream annular deflector 54 of an annular sealing element 50 of housing 5. A baffle is thus formed in the longitudinal space between internal annular platform 34 of nozzle guide vane assembly 30 and internal annular platform 44 of movable wheel 44, limiting the radially inward leakage of the gases flowing in annular path 11.

Annular element 50 comprises a cavity 51 in which an elastic member 51' is housed.

Furthermore, a stream of bleed air collected from low-pressure compressor 14 and/or high-pressure compressor 16, is directed through an annular bleed cavity 62 towards the space formed longitudinally between internal annular platform 34 of nozzle guide vane assembly 30 and internal annular platform 44 of movable wheel 4. This stream of bleed air thus makes it possible to redirect the gases that have entered bleed cavity 62, towards annular path 11.

This solution is not entirely satisfactory, however, as the collection of air from low-pressure compressor 14 and/or high-pressure compressor 16 reduces the efficiency of turbomachine 10. Furthermore, the reentry, into annular path 11, of the bleed air and gases that entered bleed cavity 62 disrupts the flow in annular path 11, which also reduces the performance of turbomachine 10.

SUMMARY

This disclosure improves the situation.

A high-pressure gas turbine for a turbomachine is proposed, extending around a longitudinal axis, the turbine comprising:
- a nozzle guide vane assembly comprising an internal annular platform and an annular array of fixed vanes, each fixed vane being connected, radially inwards, to the internal annular platform,
- an annular array of movable blades mounted downstream of the nozzle guide vane assembly, comprising a disc from which blades extend radially outwards,
- an upstream sealing element applied on a downstream face of the nozzle guide vane assembly, and a downstream sealing element applied on an upstream face of the disc of the annular array of movable blades,
- the upstream sealing element comprising an annular portion from which a downstream annular deflector extends longitudinally downstream, said annular portion having a radially outer portion comprising an upstream annular cavity, said upstream cavity being open at a radially outer annular clearance delimited between the downstream face of the nozzle guide vane assembly and the upstream sealing element,
- the downstream sealing element comprising a first upstream deflector arranged, at least in part, radially internally to the internal annular platform of the nozzle guide vane assembly and radially externally to the downstream deflector of the upstream sealing element, said downstream sealing element further comprising a second upstream deflector arranged, at least in part, radially internally to the downstream deflector, the downstream deflector extending, at least in part, radially facing the first and second upstream deflectors, the first and second upstream deflectors and the downstream deflector defining a double baffle.

The double baffle generates a pressure loss which reduces the flow rate of the gas leaking radially inwards from the annular path, between the nozzle guide vane assembly and the annular array of movable blades, and also reduces the flow rate required for the bleed air. Furthermore, the upstream annular cavity also makes it possible to reduce such a leakage flow rate, by creating additional pressure loss.

Furthermore, the bleed air flow rate required to redirect towards the annular path the hot gases which make their way between the nozzle guide vane assembly and the annular array of movable blades, is reduced. The elements of the annular array of movable blades are thus better protected. Also, the amount of bleed air taken from the high-pressure compressor and/or the low-pressure compressor is reduced, which makes it possible to improve the overall efficiency of the turbomachine and therefore to reduce the specific fuel consumption.

In this presentation, an element referred to as "annular" may comprise a plurality of ring sectors arranged circumferentially end-to-end around an axis, in particular at 360° around said axis. Of course, an "annular" element may also be one unit, meaning formed as a single piece and not from sectors.

The first upstream deflector, the second upstream deflector, and/or the downstream deflector may be cylindrical, at least in part.

The first upstream deflector may have a radially external face which is of frustoconical shape with a decreasing cross-section in the upstream direction and extending over at least a first longitudinal portion.

Such a shape makes it easier to discharge the bleed air and gases out of the cavity located between the nozzle guide vane assembly and the annular array of movable blades towards the annular path. Furthermore, such a feature allows adapting the direction in which the gases mixed into the annular path are reintroduced into the annular path, in order to minimize disruptions to the gases flowing in the annular path.

The annular space may extend between the first and second upstream deflectors and is delimited by a radially internal surface of the first upstream deflector, a radially outer surface of the second upstream deflector, and a concave upstream surface of the downstream sealing element.

The radially internal surface of the second upstream deflector may be connected to an upstream face of the downstream sealing element, by a concave rounded portion.

The upstream annular cavity of the upstream sealing element may be delimited longitudinally by a downstream radial face of the nozzle guide vane assembly and by a downstream radial wall of the upstream sealing element extending radially outwards from the annular portion of the upstream sealing element, and delimited radially by an annular end surface located at the radially outer end of said annular portion and by a longitudinal wall extending longitudinally upstream from the radially outer end of the downstream radial wall, said external annular clearance being formed longitudinally between the downstream radial face of the nozzle guide vane assembly and the upstream end of said longitudinal wall.

Said annular end surface may include a frustoconical region which widens in the downstream direction.

The radially internal annular face of the internal annular platform of the nozzle guide vane assembly may have at least one region of concave shape.

The nozzle guide vane assembly may further comprise a radial annular flange extending radially inwards from the internal annular platform, the upstream sealing element being attached and fixed to the radial annular flange. Alternatively, the upstream sealing element may be made as integral with the radial annular flange of the nozzle guide vane assembly.

Similarly, the downstream sealing element may be attached or fixed to a disc of the annular array of movable blades, or may be made as integral with the disc.

The annular array of movable blades may comprise an internal annular platform, said first upstream deflector extending from an upstream end of the internal annular platform.

Each movable blade of an annular array of movable blades may comprise a sector of the internal annular platform, said sectors being arranged circumferentially end-to-end.

Each movable blade may comprise a vane extending radially outwards from the respective sector of the internal annular platform. Each movable blade may comprise a blade root extending radially inwards from the respective sector of the internal annular platform. Each blade root may be received in an associated socket formed on the external periphery of the disc. Alternatively, each movable blade is formed as one piece with the respective sector of the internal annular platform.

This document also relates to a turbomachine comprising a high-pressure gas turbine of the aforementioned type.

BRIEF DESCRIPTION OF DRAWINGS

Other features, details, and advantages will become apparent upon reading the detailed description below, and upon analyzing the attached drawings, in which.

DETAILED DESCRIPTION

Figure 1:
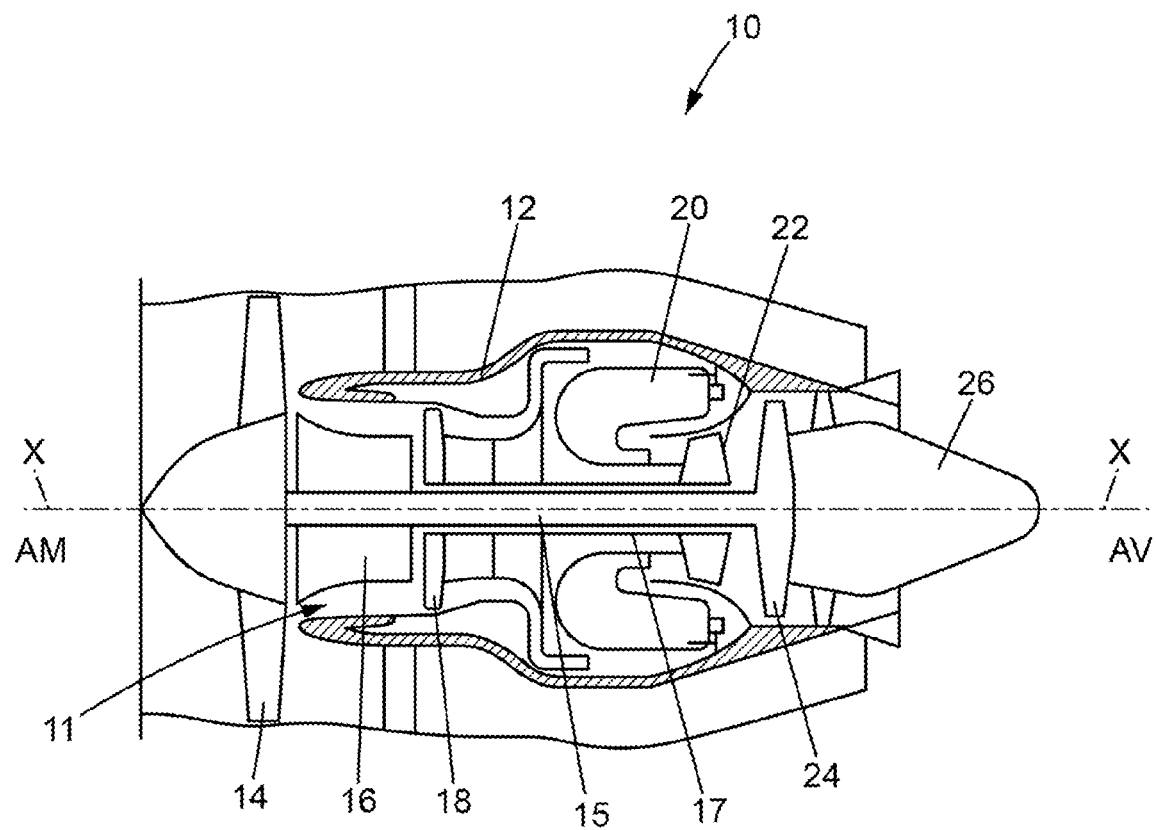
FIG. 1, already described above, is a partial schematic section view of a turbomachine of the prior art.
Figure 2:
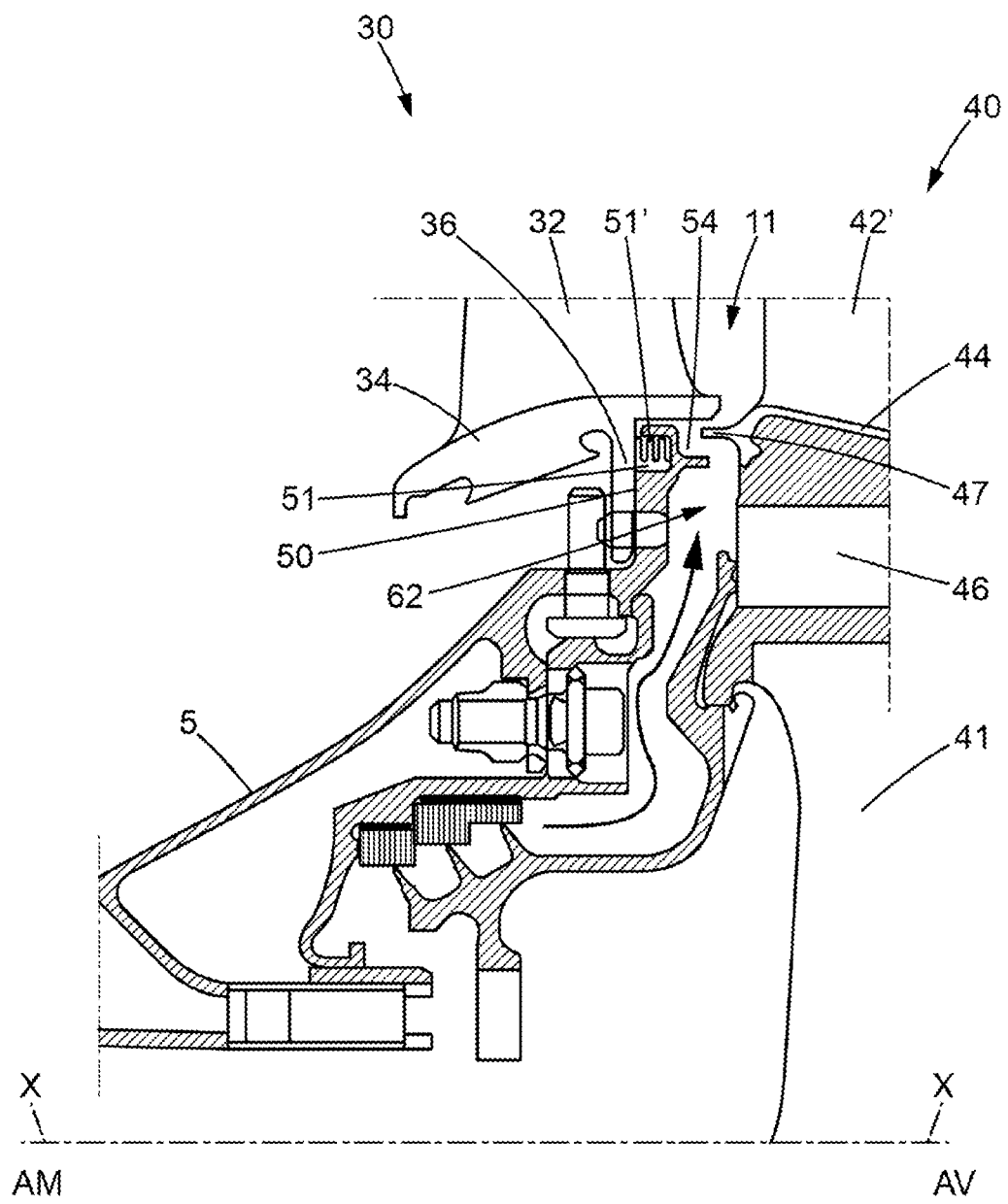
FIG. 2, already described above, is a partial schematic section view of a high-pressure turbine of the turbomachine of FIG. 1.
Figure 3:
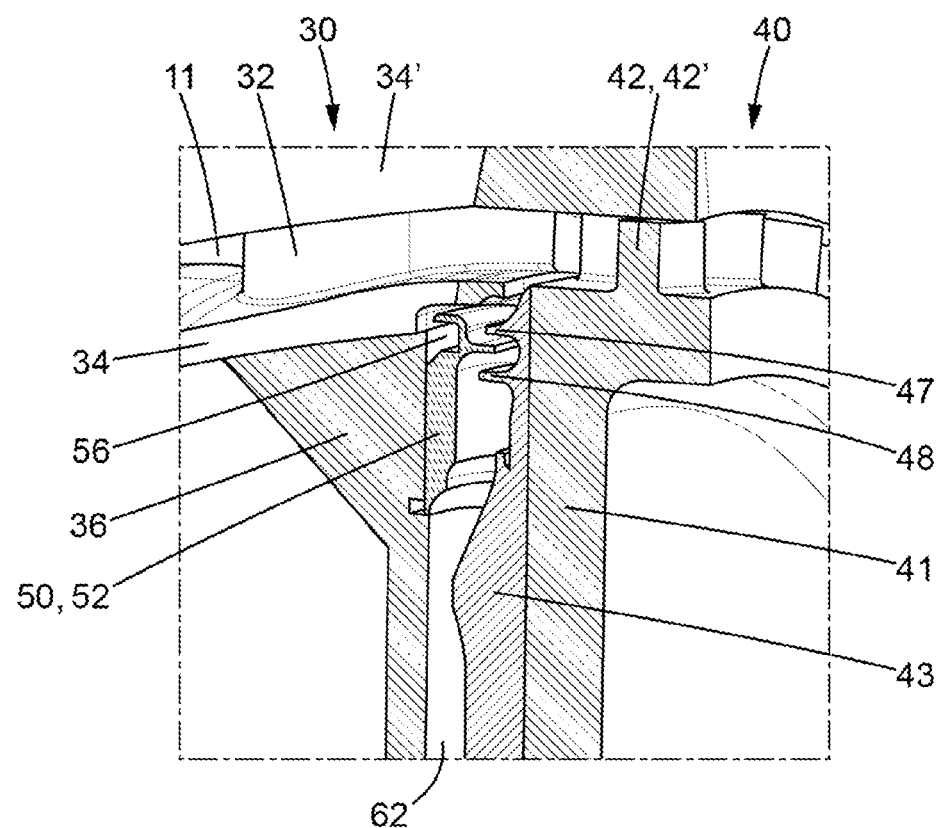
FIG. 3 is a partial schematic perspective and section view of a high-pressure turbine according to one embodiment of this document.
Figure 4:
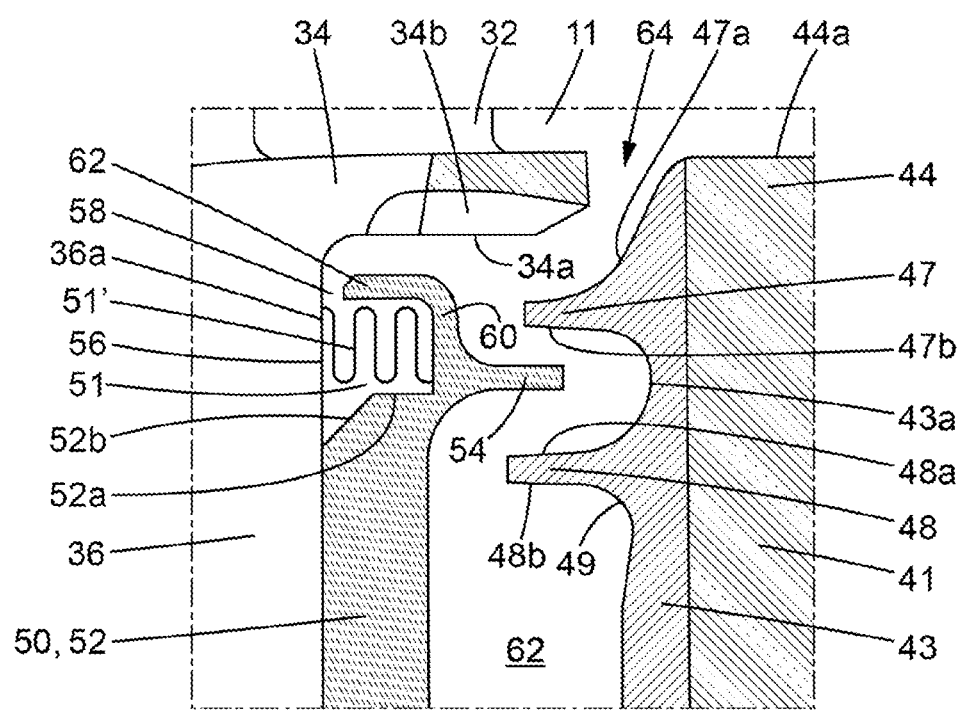
FIG. 4 is a partial schematic section view of the turbine of FIG. 3.

Reference is now made to FIGS. 3 and 4 which partially represent a high-pressure turbine of a turbomachine of longitudinal axis X, according to a first embodiment. The high-pressure turbine comprises a plurality of stages each comprising a nozzle guide vane assembly 30 and a movable wheel 40 mounted downstream of nozzle guide vane assembly 30.

Nozzle guide vane assembly 30 comprises an annular array of fixed vanes 32. Each fixed vane 32 is connected, radially inwards, to an internal annular platform 34 of nozzle guide vane assembly 30. Each fixed vane 32 extends radially outwards from internal annular platform 34. Each fixed vane 32 is connected, radially outwards, to an external platform 34' connected to an external housing of the high-pressure turbine. A radially external annular face of internal annular platform 34 and a radially internal annular face of external platform 34' delimit, respectively radially inwards and radially outwards, an annular path 11 of turbomachine 10 at nozzle guide vane assembly 30 of the high-pressure turbine. Thus, each fixed vane 32 extends radially inside annular path 11.

Nozzle guide vane assembly 30 further comprises a radial annular flange 36 extending radially inwards from internal annular platform 34. Nozzle guide vane assembly 30 may be connected to an internal turbomachine housing by means of radial annular flange 36.

Movable wheel 40 comprises an annular array of movable blades 42 carried by a disc 41. Movable wheel 40 comprises an internal annular platform 44. Each movable blade 42 of movable wheel 40 comprises a sector of internal annular platform 44, the sectors being arranged circumferentially end-to-end around the longitudinal axis X. An annular radially external face 44a of internal annular platform 44 delimits, radially inwards, annular path 11 at movable wheel 40 of the turbine. Each movable blade 42 comprises a vane 42' extending radially outwards, within annular path 11, from the respective sector of internal annular platform 44.

Movable wheel 40 also comprises a downstream sealing element 43 attached and fixed on an upstream radial surface of disc 41 and of the region comprising platform 44. Alternatively, downstream sealing element 43 may be made as integral with disc 41. Downstream sealing element 43 comprises a first upstream annular deflector 47 which is annular and which extends longitudinally upstream at the radially outer end of downstream sealing element 43. First upstream annular deflector 47 is arranged, here in part, radially internally to internal annular platform 34 of nozzle guide vane assembly 30. In other words, first upstream annular deflector 47 is arranged radially internally to internal annular platform 34 of nozzle guide vane assembly 30, and, in part, radially facing internal annular platform 34 of nozzle guide vane assembly 30. The upstream end of first upstream deflector 47 is located further upstream longitudinally than the downstream end of internal platform 34.

First upstream annular deflector 47 has a radially outer annular face 47a which is of frustoconical shape with a decreasing cross-section in the upstream direction and which extends over a longitudinal first portion of first upstream annular deflector 47. The first portion of upstream annular deflector 47 is, here in part, radially facing internal annular platform 34 of nozzle guide vane assembly 30. Radially outer annular face 47a of the first portion of upstream annular deflector 47 is connected here to radially outer annular face 44a of internal annular platform 44 of movable wheel 40, in particular by a curved surface.

Furthermore, downstream sealing element 43 comprises a second upstream annular deflector 48, extending longitudinally downstream and located radially internally to first upstream deflector 47.

The annular space extending between first and second upstream deflectors 47, 48 is delimited by a radially internal surface 47b of first upstream deflector 47, a radially outer surface 48a of second upstream deflector 48, and a concave upstream surface 43a of downstream sealing element 43.

Furthermore, second upstream deflector 48 has a radially internal surface 48b which is connected to an upstream face of downstream sealing element 43 by a concave rounded portion 49.

The high-pressure turbine further comprises an upstream sealing element 50, which is annular here, applied against a downstream face 36a of nozzle guide vane assembly 30. Here, upstream sealing element 50 is attached and fixed to radial annular flange 36. To do so, upstream sealing element 50 comprises an annular portion 52 applied against a downstream face 36a of radial annular flange 36 of nozzle guide vane assembly 30. Annular portion 52 of upstream sealing element 50 may be fixed, for example by bolting, to radial annular flange 36 of nozzle guide vane assembly 30. The upstream sealing element may be an integral part of the housing of the high-pressure turbine or of flange 36.

Upstream sealing element 50 comprises a cavity 51 in which an elastic member 51' is housed.

Upstream sealing element 50 comprises a downstream deflector 54 which is annular. First downstream annular deflector 54 is arranged, here in part, radially internally to first upstream annular deflector 47 and radially externally to second upstream deflector 48 of downstream sealing element 43. Furthermore, the downstream end of downstream deflector 54 is located further downstream longitudinally than the upstream ends of first and second upstream deflectors 47, 48. Deflectors 54, 47, 48 form a double baffle, and create pressure losses limiting the flow rate of gases able to flow radially through said double baffle.

Upstream sealing element 50 further comprises an upstream annular cavity 56, upstream cavity 56 being open at a radially outer annular clearance 58, delimited between downstream face 36a of nozzle guide vane assembly 30 and upstream sealing element 50.

Upstream annular cavity 56 of upstream sealing element 50 may be delimited longitudinally by downstream radial face 36a of nozzle guide vane assembly 30 and by a downstream radial wall 60 of upstream sealing element 50 extending radially outwards from annular part 52 of upstream sealing element 50, and delimited radially by an annular end surface 52a located at the radially outer end of said annular part 52 and by a longitudinal wall 62 extending longitudinally upstream from the radially outer end of downstream radial wall 60. External annular clearance 58 is formed longitudinally between downstream radial face 36a of nozzle guide vane assembly 30 and the upstream end of longitudinal wall 62.

Annular end surface 52a may comprise a frustoconical region 52b which widens in the downstream direction.

According to a variant not shown, annular upstream sealing element 50 may be made as integral with radial annular flange 36 of nozzle guide vane assembly 30.

According to a variant not shown, annular sealing element 50 may comprise a plurality of ring sectors arranged circumferentially end-to-end around the longitudinal axis X.

The radially internal annular face 34a of internal annular platform 34 of nozzle guide vane assembly 30 may have a concave-shaped region 34b which is arranged radially facing upstream annular deflector 47 and/or longitudinal wall 62.

The turbine further comprises an annular bleed cavity 62 located longitudinally between upstream sealing element 50 and downstream sealing element 43, or more generally between nozzle guide vane assembly 30 and movable wheel 40, and radially internally to second upstream deflector 48.

A free space 64 is formed, longitudinally, between internal annular platform 34 of nozzle guide vane assembly 30 and internal annular platform 44 of movable wheel 40. Internal annular platform 34 of nozzle guide vane assembly 30 and upstream annular deflector 47 of movable wheel 40 together define a clearance or flow channel between annular path 11 and double baffle 47, 48, 54.

In operation, hot gases coming from annular path 11 enter space 64 provided between platform 34 and platform 44, this stream of hot gases being countered by a stream of bleed air taken from low-pressure compressor 14 and/or high-pressure compressor 16, and directed through annular bleed cavity 62 and double baffle 47, 48, 54 towards path 11.

Double baffle 47, 48, 54 and upstream cavity 56 make it possible to generate pressure losses, limiting the progression of hot gases flowing radially inward from annular path 11 towards annular bleed cavity 62, also limiting the bleed air flow rate required to avoid damage to the turbine.

The invention is not limited to the examples described above and is susceptible to numerous variations. In particular, the embodiments are able to be combined.

The invention claimed is:

1. A high-pressure gas turbine for a turbomachine (10) extending around a longitudinal axis (X), the turbine comprising:
    a nozzle guide vane assembly (30) comprising an internal annular platform (34) and an annular array of fixed vanes (32), each fixed vane (32) being connected, radially inwards, to the internal annular platform (34),
    an annular array of movable blades (40) mounted downstream of the nozzle guide vane assembly (30), comprising a disc (41) from which blades (42) extend radially outwards,
    an upstream sealing element (50) applied against a downstream face of the nozzle guide vane assembly (30), and a downstream sealing element (43) applied against an upstream face of the disc (41) of the annular array of movable blades (40),
    the upstream sealing element (50) comprising an annular portion (52) from which a downstream annular deflector (54) extends longitudinally downstream, said annular portion (52) having a radially outer portion comprising a upstream annular cavity (56), said upstream cavity (56) being open at a radially outer annular clearance (58) delimited between the downstream face of the nozzle guide vane assembly (30) and the upstream sealing element (50),
    the downstream sealing element (43) comprising a first upstream deflector (47) arranged, at least in part, radially internally to the internal annular platform (34) of the nozzle guide vane assembly (30) and radially externally to the downstream deflector (54) of the upstream sealing element (50), said downstream sealing element (43) further comprising a second upstream deflector (48) arranged, at least in part, radially internally to the downstream deflector (54), the downstream deflector (54) extending, at least in part, radially facing the first and second upstream deflectors (47, 48), the first and second upstream deflectors (47, 48) and the downstream deflector (54) defining a double baffle;
    wherein the upstream annular cavity (56) of the upstream sealing element (50) is delimited longitudinally by a downstream radial face (36a) of the nozzle guide vane assembly (30) and by a downstream radial wall (60) of the upstream sealing element (50) extending radially outwards from the annular portion (52) of the upstream sealing element (50), and delimited radially by an annular end surface (52a) located at a radially outer end of said annular portion (52) and by a longitudinal wall (62) extending longitudinally upstream from the radially outer end of the downstream radial wall (60) parallel to an inner annular face (34a) of internal annular platform (34), said external annular clearance (58) being formed longitudinally between the downstream radial face (36a) of the nozzle guide vane assembly (30) and the upstream end of said longitudinal wall (62).

2. The turbine according to claim 1, wherein the first upstream deflector (47), the second upstream deflector (48), and/or the downstream deflector (54) are cylindrical, at least in part.

3. The turbine according to claim 1, wherein the first upstream deflector (47) has a radially external face (47a) which is of a frustoconical shape with a decreasing cross-section in the upstream direction and extending over at least a first longitudinal portion.

4. The turbine according to claim 1, wherein an annular space extending between the first and second upstream deflectors (47, 48) is delimited by a radially internal surface (47b) of the first upstream deflector (47), a radially outer surface (48a) of the second upstream deflector (48), and a concave upstream surface of the downstream sealing element (43).

5. The turbine according to claim 1, wherein the radially internal surface of the second upstream deflector (48) is connected to an upstream face of the downstream sealing element (43) by a concave rounded portion (49).

6. The turbine according to claim 1, wherein said annular end surface (52a) comprises a frustoconical region (52b) which widens in the downstream direction.

7. The turbine according to claim 1, wherein the radially internal annular face (34a) of the internal annular platform (34) of the nozzle guide vane assembly (30) has at least one region (34b) of concave shape.

8. The turbine according to claim 1, wherein the nozzle guide vane assembly (30) further comprises a radial annular flange (36) extending radially inwards from the internal annular platform (34), the upstream sealing element (50) being attached and fixed to the radial annular flange (36).

9. A turbomachine comprising a high-pressure gas turbine according to claim 1.

* * * * *